(12) United States Patent
Pandit et al.

(10) Patent No.: US 11,533,246 B1
(45) Date of Patent: Dec. 20, 2022

(54) NETWORK PROBE PLACEMENT OPTIMIZATION

(71) Applicant: AT&T Intellectual Property I, L.P., Atlanta, GA (US)

(72) Inventors: Kartik Pandit, Aberdeen, NJ (US); Kevin D'Souza, Yardley, PA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/492,916

(22) Filed: Oct. 4, 2021

(51) Int. Cl.
*H04L 12/24* (2006.01)
*H04L 43/12* (2022.01)
*H04L 41/142* (2022.01)
*H04L 43/10* (2022.01)

(52) U.S. Cl.
CPC ............ *H04L 43/12* (2013.01); *H04L 41/142* (2013.01); *H04L 43/10* (2013.01)

(58) Field of Classification Search
CPC ........ H04L 43/12; H04L 41/142; H04L 43/10
See application file for complete search history.

(56) References Cited

U.S. PATENT DOCUMENTS

| | | | | |
|---|---|---|---|---|
| 11,323,312 | B1 * | 5/2022 | Banka | H04L 43/12 |
| 2005/0259005 | A1 * | 11/2005 | Chiang | H01Q 25/00 |
| | | | | 342/373 |
| 2010/0191505 | A1 * | 7/2010 | Chen | H04L 43/10 |
| | | | | 702/182 |
| 2016/0294646 | A1 * | 10/2016 | Kirner | H04L 41/5058 |
| 2016/0294664 | A1 * | 10/2016 | Manghirmalani | H04L 43/12 |
| 2020/0153701 | A1 * | 5/2020 | Mohan | H04L 41/147 |
| 2020/0296011 | A1 * | 9/2020 | Jain | H04L 41/40 |
| 2020/0310846 | A1 * | 10/2020 | Moradi | G06F 9/45558 |

(Continued)

FOREIGN PATENT DOCUMENTS

WO     WO-2013184846 A1 * 12/2013  ............ G06F 11/008

OTHER PUBLICATIONS

David Nicol, Efficient Monte Carlo Evaluation of SDN Resiliency, May 2016, URL retrieved via: https://dl.acm.org/doi/pdf/10.1145/2901378.2901401 (Year: 2016).*

(Continued)

*Primary Examiner* — Schquita D Goodwin
(74) *Attorney, Agent, or Firm* — Amin, Turocy & Watson, LLP

(57) ABSTRACT

Intelligent network probe placement optimization (e.g., using a computerized tool) is enabled. A method can comprise determining, from an inventory database, physical interfaces and service paths for data traffic to be monitored, according to a two-way active management protocol, with respect to network interfaces between cloud compute elements in a leaf-spine cloud fabric and radio access network equipment, based on the cloud compute elements, determining directed acyclic graph information representative of a directed acyclic graph of connections between the cloud compute elements and other cloud compute elements in the leaf-spine cloud fabric other than the cloud compute elements, and based on the directed acyclic graph information, determining a number and a distribution of probes to be employed at at least some of the physical interfaces and the service paths to monitor a parameter of the data traffic according to the two-way active management protocol.

20 Claims, 11 Drawing Sheets

(56) References Cited

U.S. PATENT DOCUMENTS

2021/0168068 A1\* 6/2021 Shenoy ................... H04L 41/12
2022/0006701 A1\* 1/2022 Patel ....................... H04L 41/12
2022/0029876 A1\* 1/2022 Mercian .................. H04L 49/25

OTHER PUBLICATIONS

Dave Killoran, Quantity Terminology: Some, Few, Several, and Many, Sep. 16, 2019, URL retrieved: https://blog.powerscore.com/lsat/bid-153449-lsat-quantity-terminology-some-few-several-and-many/#:~:text=As%20we%20discuss%20in,all%20portion%20that%20surprises%20them. (Year: 2019).\*

\* cited by examiner

NETWORK PROBE PLACEMENT OPTIMIZATION

TECHNICAL FIELD

The disclosed subject matter relates to network probe placement and, more particularly, to optimized placement of virtual or hardware two-way active measurement protocol probes in a network.

BACKGROUND

Interconnect services for edge compute platforms are provided by a physical cloud fabric, which are typically implemented as tree topologies with leaf-spine elements. Routing in a fabric is often achieved using logical virtual local area network (VLAN) or virtual extensible local area network (VXLAN), in which internet protocol (IP) flows from endpoints are hashed to a particular physical output interface, forming a physical network path, and are managed via the logical VLAN and/or VXLAN. Adding redundancy to network designs increases the number of physical paths. Due to network management, operations, and capacity considerations, it is not feasible to implement active probes to cover every physical network path.

Active probing can introduce a large amount of network probe traffic, which can lead to undesirable network performance. Further, routing algorithms used in a dense network, such as the cloud fabric, may not route the probe traffic in the same path as customer traffic, which can be useful to measure in order to analyze a customer's aggregated experience.

The above-described background relating to network probe placement optimization is merely intended to provide a contextual overview of some current issues and is not intended to be exhaustive. Other contextual information may become further apparent upon review of the following detailed description.

DETAILED DESCRIPTION

Figure 1:
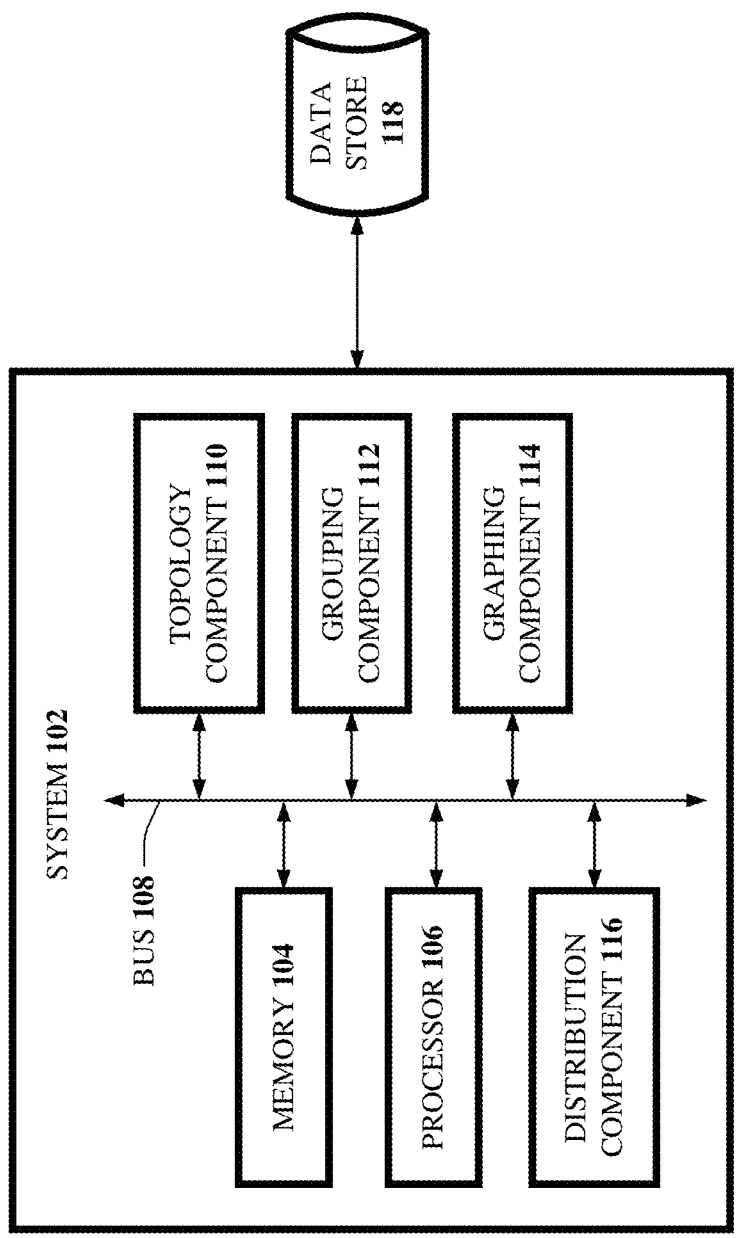
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, network probe placement can be improved in various ways, and various embodiments are described herein to this end and/or other ends.

Future fifth generation (5G) and sixth generation (6G) networks can be implemented on edge compute platforms. It can be important to monitor the performance and reliability of the edge fabric and the interconnect, for instance, between a carrier edge cloud and public cloud in order to help meet 5G or 6G performance and reliability service level agreements.

Two-Way Active Measurement Protocol (TWAMP) active probes are a standards-based, deterministic, and are highly accurate and reliable tools for monitoring a network path as a result of their ability to provide real time data on link status (e.g., up/down) and network performance key performance indicators (KPIs), such as latency, loss, and jitter, which cannot be accurately estimated from existing, passive solutions. TWAMP measurement can implemented across multiple platforms, and can therefore provide a ubiquitous solution for such monitoring. It is noted that embodiments herein are not confined to the use of TWAMP active probes. In this regard, other suitable physical or virtual network probes (e.g., that can facilitate two-way active network measurements) can be utilized in various embodiments herein.

Embodiments herein can utilize active network probes (e.g., TWAMP probes) into a network fabric. Embodiments herein can be utilized in order to minimize the number of probes and the associated volume of probe traffic, while maximizing probe coverage of a corresponding network. Embodiments herein can be further utilized with any type of network. In this regard, although several embodiments herein emphasize use with 5G and 6G edge cloud applications, it is noted that these are nonlimiting examples. For example, networks herein can comprise fixed wireless internet networks, mobility networks, fiber networks, network backbones, or other suitable networks.

Embodiments herein can enable highly accurate service level agreement (SLA) reports to be generated based on probed network performance. Further embodiments herein can be utilized to determine a minimum set of probes to be deployed in order to achieve full network coverage within a defined level of statistical certainty (e.g., between network edges). In this regard, network capacity constraints (e.g., from network probes) can be reduced in addition to data storage and analytics costs, because samples collected herein can also be minimized, for instance, utilizing embodiments described herein. It is noted that by reducing bandwidth consumed by the use of network probes, bandwidth can be maximized for customer traffic use, thus improving network customer experiences.

According to an embodiment, a system can comprise a processor, and a memory that stores executable instructions that, when executed by the processor, facilitate performance of operations, comprising: determining, from an inventory data store, physical interfaces and service paths for data traffic to be monitored, according to a two-way active management protocol, with respect to network interfaces between cloud compute elements in a leaf-spine cloud fabric and radio access network equipment, based on the physical interfaces and the service paths, determining a group of the cloud compute elements, based on the group of the cloud compute elements, determining directed acyclic graph information representative of a directed acyclic graph of connections between the group of the cloud compute elements and other groups of other cloud compute elements in the leaf-spine cloud fabric other than the group of the cloud compute elements, and based on the directed acyclic graph information, determining a number and a distribution of probes to be employed at at least some of the physical interfaces and the service paths to monitor a parameter of the data traffic according to the two-way active management protocol.

In various embodiments, the above operations can further comprise determining a minimum set of paths of data traffic between groups of cloud compute elements in the leaf-spine cloud fabric for monitoring according to the two-way active management protocol. In this regard, the number and the distribution of the probes can be determined to monitor the minimum set of paths of data traffic.

In one or more embodiments, probes herein can comprise pairs of sender probes and receiver probes defined according to the two-way active management protocol. In some embodiments, such probes can comprise physical network probes. In further embodiments, such probes can comprise virtual network probes. In various embodiments, the probes can determine at least one of a latency, a loss, or a jitter of the data traffic. In further embodiments, the probes can determine at least two of a latency, a loss, or a jitter of the data traffic. In one or more embodiments, the probes can be further employed at compute nodes in the leaf-spine cloud fabric.

In some embodiments, the above operations can further comprise generating a Monte Carlo sampling for attribute values for the probes, wherein the attribute values comprise source-ip, destination-ip, source-port, and destination-port, and based on the Monte Carlo sampling, determining a minimum quantity of samples of the service paths for use in monitoring the probes. It is noted that determining the minimum quantity of samples of the service paths can comprise determining the minimum quantity of samples of the service paths based on a specified degree of statistical certainty. In this regard, determining the minimum quantity of samples of the service paths can be a function of the specified degree of statistical certainty. In some embodiments, increasing the specified degree of statistical certainty results in a larger quantity of samples. In further embodiments, decreasing the specified degree of statistical certainty results in a smaller quantity of samples.

In some embodiments, the number and the distribution of probes to be employed are further determined using a depth first search function.

In another embodiment, a non-transitory machine-readable medium can comprise executable instructions that, when executed by a processor, facilitate performance of operations, comprising: determining, from an inventory database, physical interfaces and service paths for data traffic to be monitored, according to a two-way active management protocol, with respect to network interfaces between cloud compute elements in a leaf-spine cloud fabric and radio access network equipment, based on the cloud compute elements, determining directed acyclic graph information representative of a directed acyclic graph of connections between the cloud compute elements and other cloud compute elements in the leaf-spine cloud fabric other than the cloud compute elements, and based on the directed acyclic graph information, determining a number and a distribution of probes to be employed at at least some of the physical interfaces and the service paths to monitor a parameter of the data traffic according to the two-way active management protocol.

In some embodiments, the above operations can further comprise determining a minimum set of paths of data traffic among the cloud compute elements in the leaf-spine cloud fabric and the other cloud compute elements in the leaf-spine cloud fabric for monitoring according to the two-way active management protocol. In this regard, the number and the distribution of the probes can be determined to monitor the minimum set of paths of data traffic.

In various embodiments, the above operations can further comprise determining a quantity of samples conducted by the probes required to achieve a defined degree of statistical certainty for sampling coverage for the parameter of the data traffic.

In one or more embodiments, the quantity of samples can be determined using a harmonic series function associated with the service paths. It is noted that samples herein can be conducted according to a defined flow duration. For example, the defined flow duration can be approximately six minutes, though other suitable flow durations can be utilized.

According to yet another embodiment, a method can comprise determining, by network equipment comprising processor, from an inventory data store, physical interfaces and service paths for data traffic to be monitored, according to a two-way active management protocol, with respect to network interfaces between cloud compute elements in a leaf-spine cloud fabric and radio access network equipment, determining, by the network equipment, a number and a distribution of probes to be employed at at least some of the physical interfaces and the service paths to monitor a parameter of the data traffic according to the two-way active management protocol, and based on the number and the distribution of the probes, determining, by the network equipment, a quantity of samples conducted by the probes required to satisfy a defined confidence level of sampling coverage for the parameter of the data traffic. In some embodiments, the quantity of samples can be determined, by the network equipment, using a harmonic series function associated with the service paths.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool, which can be configured to perform various operations relating to network probe placement optimization. The system 102 can comprise one or more of a variety of components, such as memory 104, processor 106, bus 108, topology component 110, grouping component 112, graphing component 114, and/or distribution component 116. Additionally, the system 102 can be communicatively coupled to (or can comprise) data store 118.

In various embodiments, one or more of the memory 104, processor 106, bus 108, topology component 110, grouping component 112, graphing component 114, distribution component 116, and/or data store 118 can be communicatively or operably coupled (e.g., over a bus or wireless network) to one another to perform one or more functions of the system 102.

According to an embodiment, the topology component 110 can determine (e.g., from an inventory data store such as a data store 118), physical interfaces and service paths for data traffic to be monitored, for instance, according to a two-way active management protocol (TWAMP), with respect to network interfaces between cloud compute elements in a leaf-spine cloud fabric and radio access network equipment. In various embodiments, the data store 118 can comprise an inventory (e.g., a V(X)LAN inventory) that identifies compute pods that are part of a service path (e.g., a 5G or 6G service path). According to an example, total service paths can be determined by summing each possible service path in a leaf-spine cloud fabric.

According to an embodiment, the grouping component 112 can determine a group of the cloud compute elements (e.g., based on the physical interfaces and the service paths). For instance, compute elements in the leaf-spine cloud fabric can grouped into pods (e.g., groups). In this regard, such pods or groups can comprise groups of compute elements and/or other elements in the leaf-spine cloud fabric. It is noted that pods or groups herein can comprise control plane pods, user plane pods, or other suitable pods or pod identities. In this regard, network performance and/or reliability can be determined between pods, between a pod and an external connection, or between other suitable components. The foregoing can be achieved by placing a network probe herein at a compute element of a pod, rather than at every network element or every compute element. In this regard, a pod herein can comprise more than one compute element.

According to an embodiment, the graphing component 114 can, based on the group (e.g., pod) of the cloud compute elements (e.g., compute 532), determine directed acyclic graph (DAG) information representative of a DAG of connections between the group of the cloud compute elements (e.g., pod 504) and other groups of other cloud compute elements in the leaf-spine cloud fabric other than the group of the cloud compute elements (e.g., pod 506). For instance, the graphing component can transform the inventory data into a directed acyclic graph (DAG) as follows:

Every pod or group can represent a node.
Every C-leaf (e.g., lowest level of the tree), spine, Agg-leaf, P function (e.g., top level of the tree) can represent a node.
From every node, the graphing component 114 can add a directed arc to the adjacent node (e.g., C-leaf, spine switch, and Agg-Leaf) as specified in a physical interface inventory database (e.g., data store 118).
The preceding steps can be repeated, for instance, starting from the highest node in a leaf-spine tree network fabric herein to the lowest.

According to an embodiment, the distribution component 116 can, based on the directed acyclic graph information, determine a number and a distribution of probes to be employed at at least some of the physical interfaces and the service paths to monitor a parameter of the data traffic according to the two-way active management protocol. In this regard, the distribution component 116 can identify the compute pods that are part of a 5G service path, for instance, from the corresponding nodes in the DAG and/or the V(X) LAN inventory (e.g., data store 118). It is noted that such probes herein (e.g., active probes) can comprise pairs of sender probes and receiver probes defined according to TWAMP, and can comprise virtual and/or physical probes. In various embodiments, such probes can comprise pairs of sender and responder probes.

Figure 2:
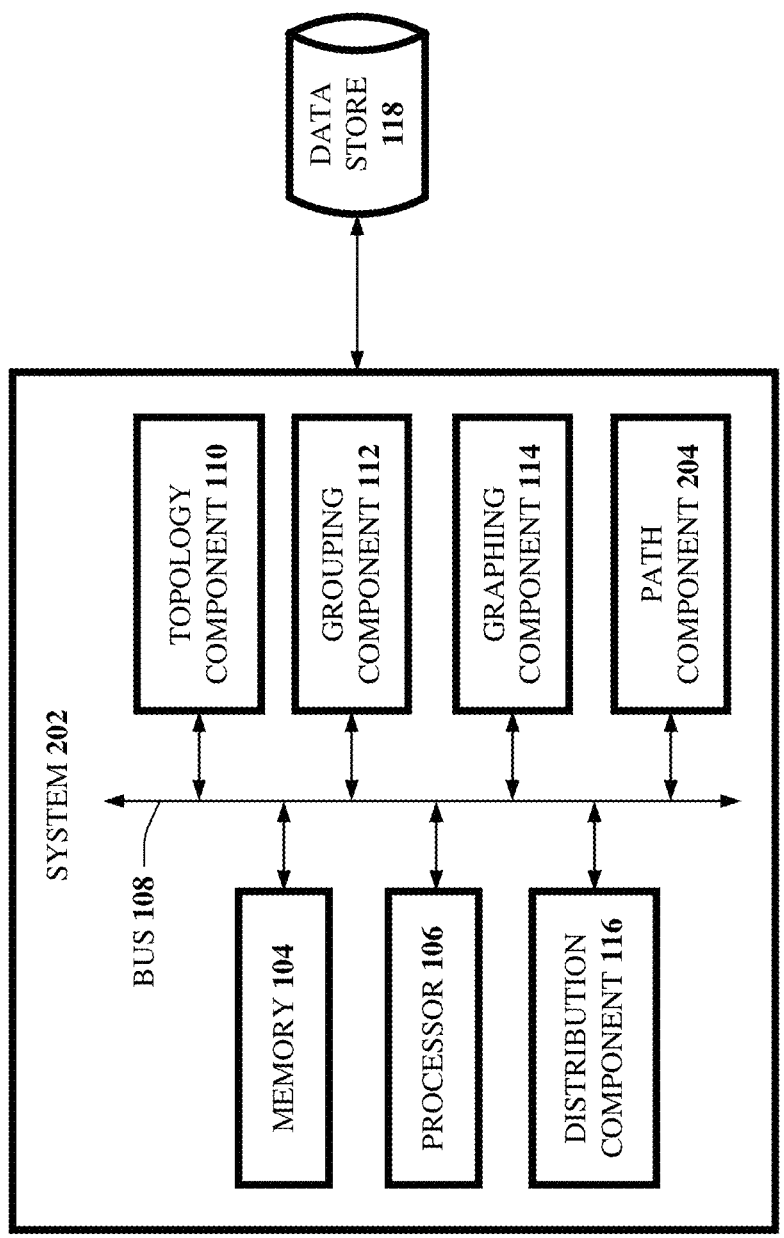
FIG. 2 is a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to network probe placement optimization. The system 202 can be similar to system 102, and can comprise one or more of a variety of components, such as memory 104, processor 106, bus 108, topology component 110, grouping component 112, graphing component 114, and/or distribution component 116. It is noted that the system 202 can be communicatively coupled to (or can comprise) data store 118. The system 202 can additionally comprise a path component 204.

In various embodiments, one or more of the memory 104, processor 106, bus 108, topology component 110, grouping component 112, graphing component 114, distribution component 116, data store 118, and/or path component 204 can be communicatively or operably coupled (e.g., over a bus or wireless network) to one another to perform one or more functions of the system 202.

According to an embodiment, the path component 204 can determine a minimum set of paths of data traffic between groups of cloud compute elements in the leaf-spine cloud fabric for monitoring according to the two-way active management protocol. In this regard, the number and the distribution of the probes can be determined to monitor the minimum set of paths of data traffic. For instance, the path component 204 can utilize a depth first search (DFS) algorithm to count all the paths in the DAG between all pairs of 5G service or 6G service nodes. According to an embodiment, the aforementioned paths can represent a minimum set of paths to be monitored, which can be utilized by the distribution component 116 to identify where to place an TWAMP "sender" active probe and TWAMP "responder" probe in each 5G or 6G service node pair.

Figure 3:
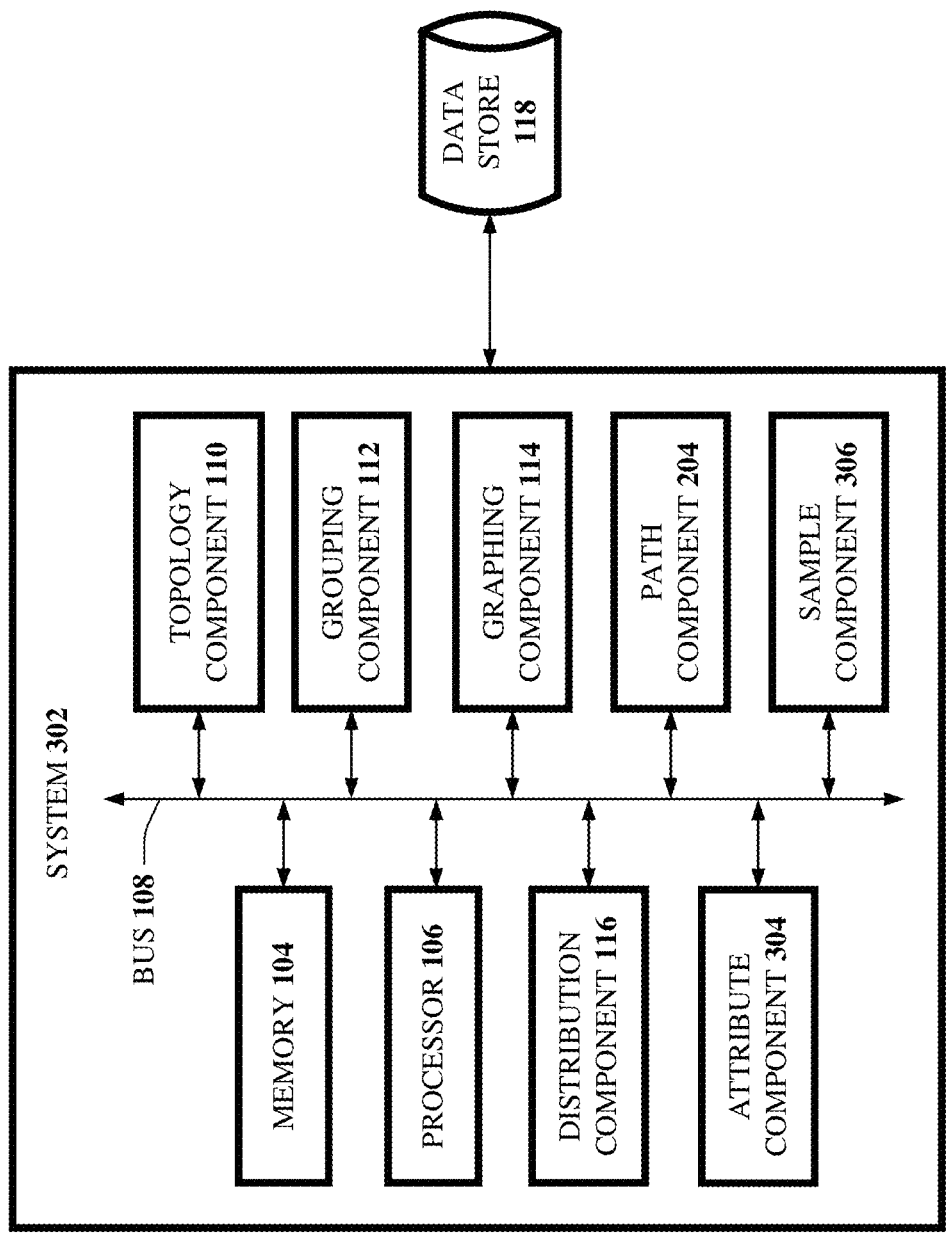
FIG. 3 is a block diagram of an exemplary system in accordance with one or more embodiments described herein.

Turning now to FIG. 3, there is illustrated an example, non-limiting system 302 in accordance with one or more embodiments herein. System 302 can comprise a computerized tool, which can be configured to perform various operations relating to network probe placement optimization. The system 302 can be similar to system 202, and can comprise one or more of a variety of components, such as memory 104, processor 106, bus 108, topology component 110, grouping component 112, graphing component 114, distribution component 116, and/or path component 204. It is noted that the system 302 can be communicatively coupled to (or can comprise) data store 118. The system 302 can additionally comprise an attribute component 304 and/or a sample component 306.

In various embodiments, one or more of the memory 104, processor 106, bus 108, topology component 110, grouping component 112, graphing component 114, distribution component 116, data store 118, path component 204, attribute component 304, and/or sample component 306 can be communicatively or operably coupled (e.g., over a bus or wireless network) to one another to perform one or more functions of the system 302.

It is noted that in some embodiments, the DFS algorithm can yield a large quantity of physical paths to be monitored, depending on network size. In some cases, the quantity of physical paths can be prohibitively large, such that placing probes to monitor every path can negatively impact overall network performance. Therefore, the attribute component 304 can generate a Monte Carlo sampling for attribute values for the probes. In this regard, wherein the attribute values comprise source-ip, destination-ip, source-port, and destination-port. Further in this regard, the attribute component 304 can randomize one or more of source-ip, destination-ip, source-port, and destination-port. Thus, a hashing algorithm can be utilized (e.g., at network switches or other suitable components) in order to randomly assign one or more of the attribute values to a physical interface herein. The foregoing can be utilized in order to estimate probabilities for when a particular physical link is covered by a network probe herein.

According to an embodiment, the sample component 306 can maintain probe flow for a defined flow duration (e.g., an approximately six minute duration) so that a statistically significant measurement key performance indicator (KPI) sample can be collected. The aforementioned defined flow duration can represent a measurement cycle (e.g., of defined flow durations). By changing said attribute values, the sample component 306 can obtain a Monte Carlo sampling of the diverse physical paths, since the probe flows can be hashed to a different physical link every time an attribute changes. In this regard, the sample component 306 can, based on the Monte Carlo sampling, determine a minimum quantity of samples of the service paths for use in monitoring the probes. The sample component 306 can determine an estimated quantity of samples T required to achieve coverage c using the following inequality:

$$P(T \geq cnH_n) \leq \frac{1}{c} \qquad \text{Equation (1)}$$

In this regard:

P can represent probability;

T can represent samples or trials;

c can represent a confidence interval for desired coverage (e.g., set c=1 representing 100%, set c=2 representing 50%, and so on);

n can represent a quantity of physical paths; and $H_n$ can represent a harmonic series up to n.

In this regard, it is noted that determining the minimum quantity of samples of the service paths can comprise determining the minimum quantity of samples of the service paths based on a specified degree of statistical certainty. For instance, increasing the specified degree of statistical certainty can result in a larger quantity of samples. Similarly, decreasing the specified degree of statistical certainty can result in a smaller quantity of samples.

Figure 4:
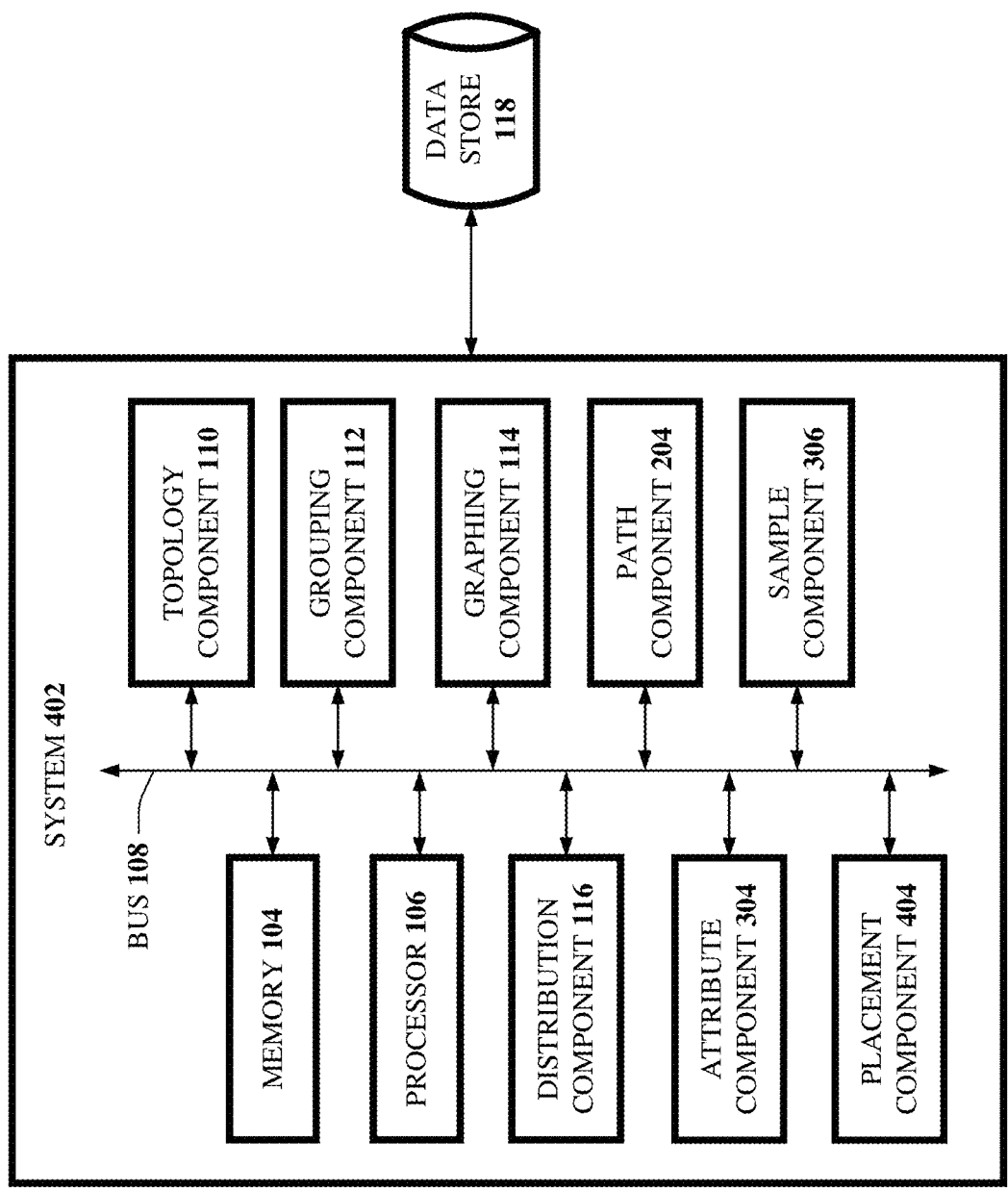
FIG. 4 is a block diagram of an exemplary system in accordance with one or more embodiments described herein.

Turning now to FIG. 4, there is illustrated an example, non-limiting system 402 in accordance with one or more embodiments herein. System 402 can comprise a computerized tool, which can be configured to perform various operations relating to network probe placement optimization. The system 402 can be similar to system 302, and can comprise one or more of a variety of components, such as memory 104, processor 106, bus 108, topology component 110, grouping component 112, graphing component 114, distribution component 116, path component 204, attribute component 304, and/or sample component 306. It is noted that the system 302 can be communicatively coupled to (or can comprise) data store 118. The system 402 can additionally comprise a placement component 404.

In various embodiments, one or more of the memory 104, processor 106, bus 108, topology component 110, grouping component 112, graphing component 114, distribution component 116, data store 118, path component 204, attribute component 304, sample component 306, and/or placement component 404 can be communicatively or operably coupled (e.g., over a bus or wireless network) to one another to perform one or more functions of the system 402.

According to an embodiment, the placement component 404 can place one or more probes (e.g., virtual network probes) in a network herein. For instance, after determining a number and distribution of TWAMP probes to place in a network (e.g., a computes or other suitable network elements), the placement component 404 can place such probes within the network fabric at one or more suitable locations determined, for instance, using the sample component 306 or another suitable component or system herein.

Figure 5:
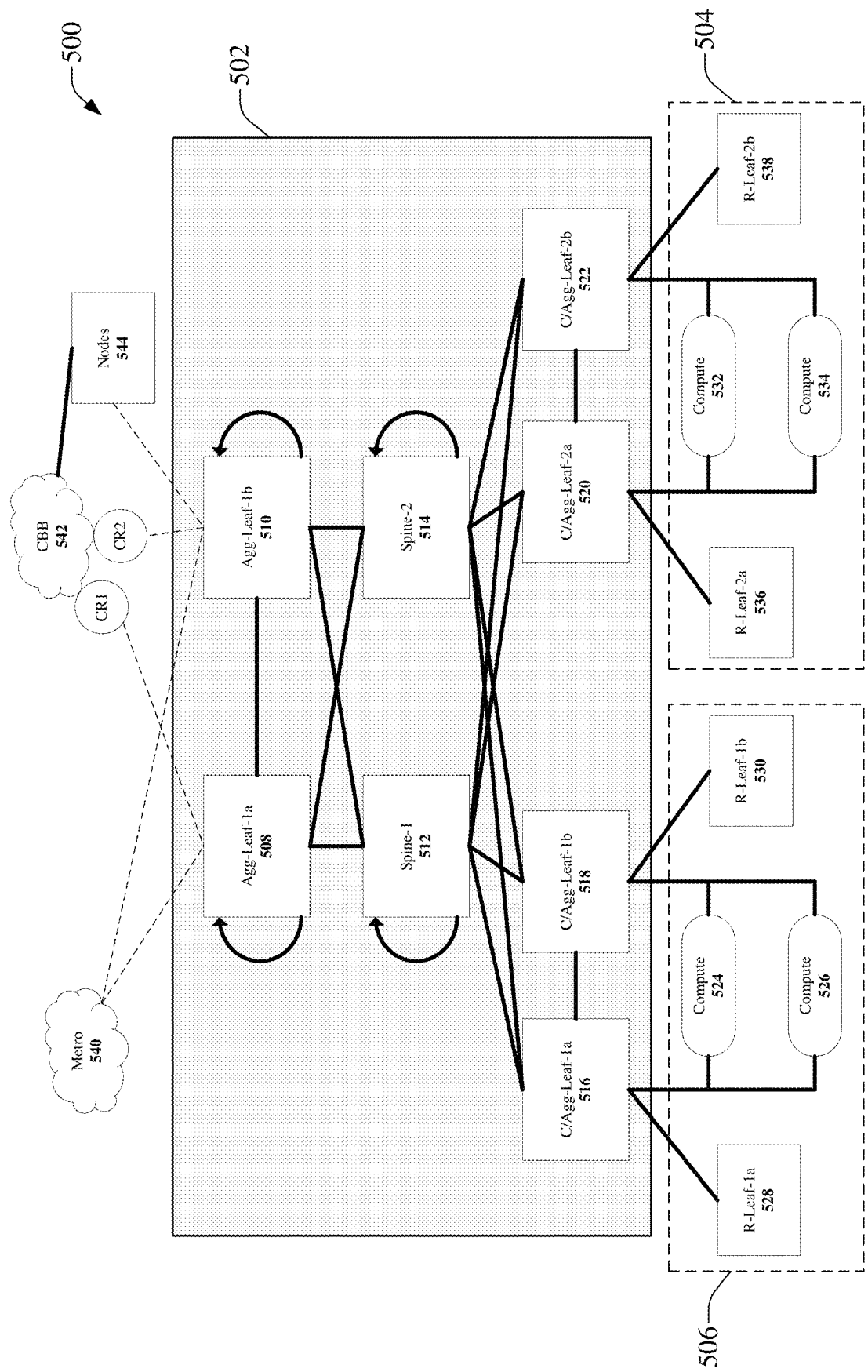
FIG. 5 is a diagram of exemplary system topology in accordance with one or more embodiments described herein.

With reference to FIG. 5, there is illustrated a diagram of exemplary system topology 500 in accordance with one or more embodiments described herein. For instance, the topology 500 can comprise a network cloud local fabric 502, a pod 504, a pod 506, metro network 540, common backbone network (CBB) 542 communicatively coupled to core routers (e.g., CR1 and/or CR2), and/or other nodes 544. CBB 542 can comprise, for instance, core internet within an enterprise. It is noted that topology 500 is an exemplary topology, described and depicted for purposes of understanding, and that embodiments herein can comprise or utilize a variety of topology variations as would be understood by one skilled in the art.

According to an embodiment, the network cloud local fabric 502 can comprise an Agg-Leaf-1*a* 508, Agg-Leaf-1*b* 510, Spine-1 512, Spine-2 514, C/Agg-Leaf-1*a* 516, C/Agg-Leaf-1*b* 518, C/Agg-Leaf-2*a* 520, C/Agg-Leaf-2*b* 522, and/or other suitable components. In various embodiments, C-Agg-Leaves herein can comprise network components that host and/or aggregate compute connections into a network (e.g., metro 540). For instance, a C-Agg-Leaf herein can comprise a combined customer (e.g., access) and aggregation leaf switch in leaf/spine design. Additionally, an Agg-Leaf herein can comprise an aggregation leaf switch in a leaf/spine design. It is noted that, in various embodiments, a spine herein can comprise a spine switch in a leaf/spine switch design.

According to an embodiment, the metro 540 can comprise a consumer internet node, such as a connection point to a wireless (e.g., 5G or 6G) network or a fiber network. In one or more embodiments, Agg-Leaves herein can comprise handoff points to a larger backbone network (e.g., to a CBB 542 via CR1 and/or CR2). Agg-Leaves herein can further handoff network connections to other suitable nodes (e.g., nodes 544). Spines herein can comprise a local switching fabric, which can aggregate connectivity within a network cloud local fabric 502, within a respective pod, and/or within a specific network location.

According to an embodiment, pod 504 (e.g., a group of compute cloud elements) can comprise compute element 532, compute element 534, R-Leaf-2*a* 536, R-Leaf-2*b* 538, and/or other suitable components. Likewise, pod 506 can comprise compute element 524, compute element 526, R-Leaf-1*a* 528, R-Leaf-1*b* 530, and/or other suitable components. In various embodiments, an R-Leaf can comprise a layer 3 routing leaf in a leaf/spine design. In this regard, R-Leaves herein can handoff network traffic, for instance, to an IP layer 3 core network and utilize a layer 3 handoff. It is noted that R-Leaves herein can comprise one or more layer 2 constructs.

In topology 500, all logical paths (e.g., as denoted by connection lines herein) can comprise layer 2 or layer 3 paths, which can be multiplexed on a physical connection. In this regard, every IP flow travels over a local path, and each logical path can be hashed to a physical path. As network size increases, the quantity of combinations of physical paths can become exponentially large, which can ultimately require a prohibitive quantity of network probes if probes are placed at every connection on every path (e.g., due to system performance constraints).

Figure 6:
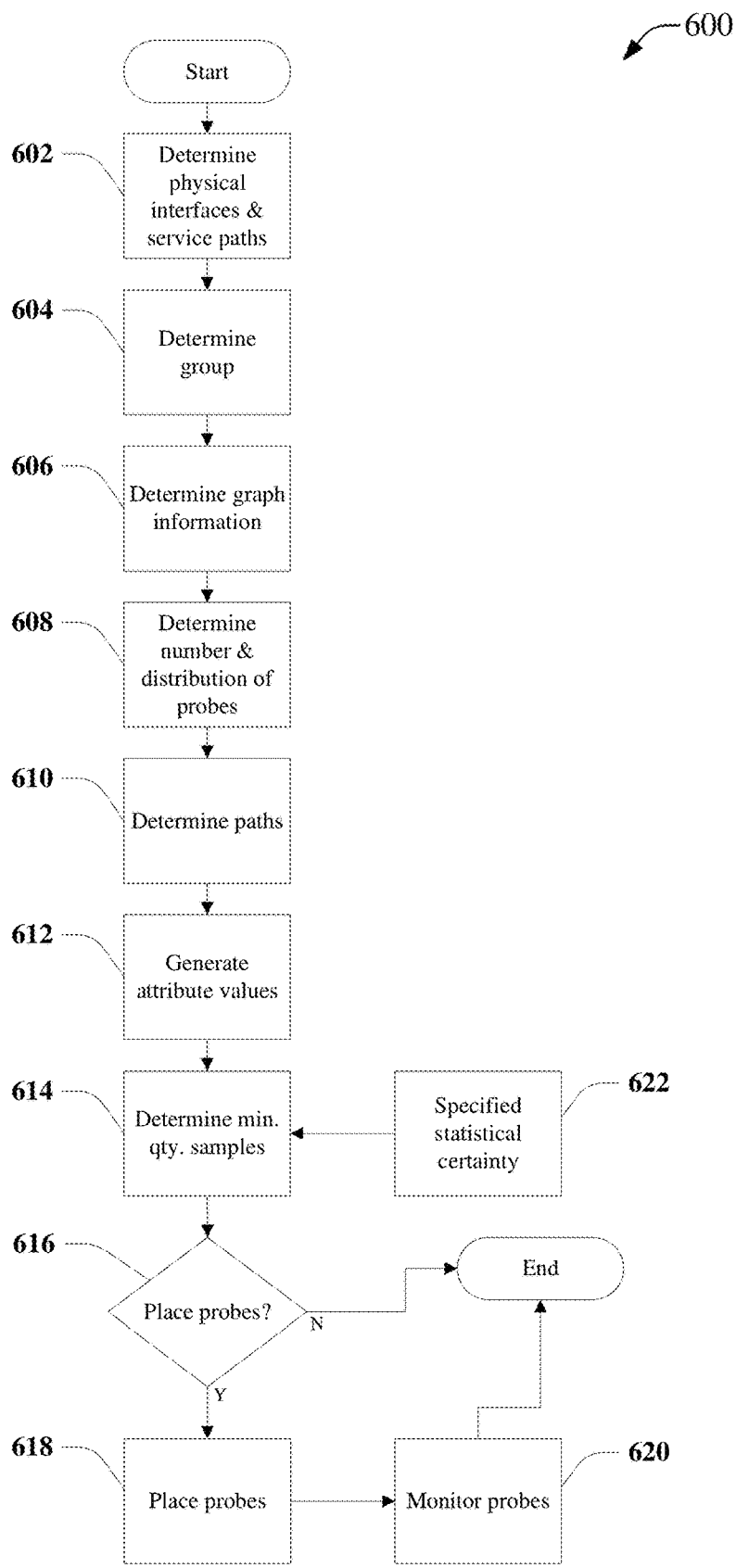
FIG. 6 is a flowchart for a process associated with network probe placement optimization in accordance with one or more embodiments described herein.

Turning now to FIG. 6, there is illustrated a flow chart of a process 600 relating to network probe placement optimization in accordance with one or more embodiments described herein. At 602, the process 600 can comprise determining (e.g., using a topology component 110), from an inventory data store (e.g., data store 118), physical interfaces and service paths for data traffic to be monitored, according to a two-way active management protocol, with respect to network interfaces between cloud compute elements in a leaf-spine cloud fabric (e.g., network cloud local fabric 502) and radio access network equipment (e.g., metro 540). At 604, the process 600 can comprise based on the physical interfaces and the service paths, determining (e.g., using the grouping component 112) a group of the cloud compute elements. At 606, the process 600 can comprise based on the group of the cloud compute elements, determining (e.g., using the graphing component 114) directed acyclic graph information representative of a directed acyclic graph of connections between the group of the cloud compute elements (e.g., pod 506) and other groups of other cloud compute elements in the leaf-spine cloud fabric other than the group of the cloud compute elements (e.g., pod 504). At 608, the process 600 can comprise based on the directed acyclic graph information, determining (e.g., using the distribution component 116) a number and a distribution of probes to be employed at at least some of the physical interfaces and the service paths to monitor a parameter of the data traffic according to the two-way active management protocol. At 610, the process 600 can comprise determining (e.g., using the path component 204) a minimum set of paths of data traffic between groups of cloud compute elements in the leaf-spine cloud fabric for monitoring according to the two-way active management protocol. In this regard, the number and the distribution of the probes can be determined to monitor the minimum set of paths of data traffic. At 612, the process 600 can comprise generating (e.g., using an attribute component 304) a Monte Carlo sampling for attribute values for the probes. In this regard, the attribute values comprise source-ip, destination-ip, source-port, and/or destination-port. At 614, the process 600 can comprise based on the Monte Carlo sampling, determining (e.g., using the sample component 306) a minimum quantity of samples of the service paths for use in monitoring the probes. It is noted that determining the minimum quantity of samples at of the service paths at 614 can comprise determining the minimum quantity of samples of the service paths based on a specified degree of statistical certainty. In this regard, a specified, defined, or otherwise determined degree of statistical certainty at 622 can be utilized as an input at 614 in the determination of the minimum quantity of samples. At 616, if probes (e.g., virtual network probes) are to be placed, the process 600 can proceed to 618, otherwise the process 600 can end or repeat. At 618, the process 600 can comprise placing probes (e.g., virtual network probes) at determined locations within a network. At 620, the process 600 can comprise monitoring the placed network probes (e.g., according to a defined flow duration interval or measurement cycle herein. In various embodiments, monitoring of the probes can be utilized to generate (e.g., using the placement component 404 or another suitable component or system herein) a highly accurate report of network performance and reliability, while minimizing network capacity constraints and operations costs of active probes.

Figure 7:
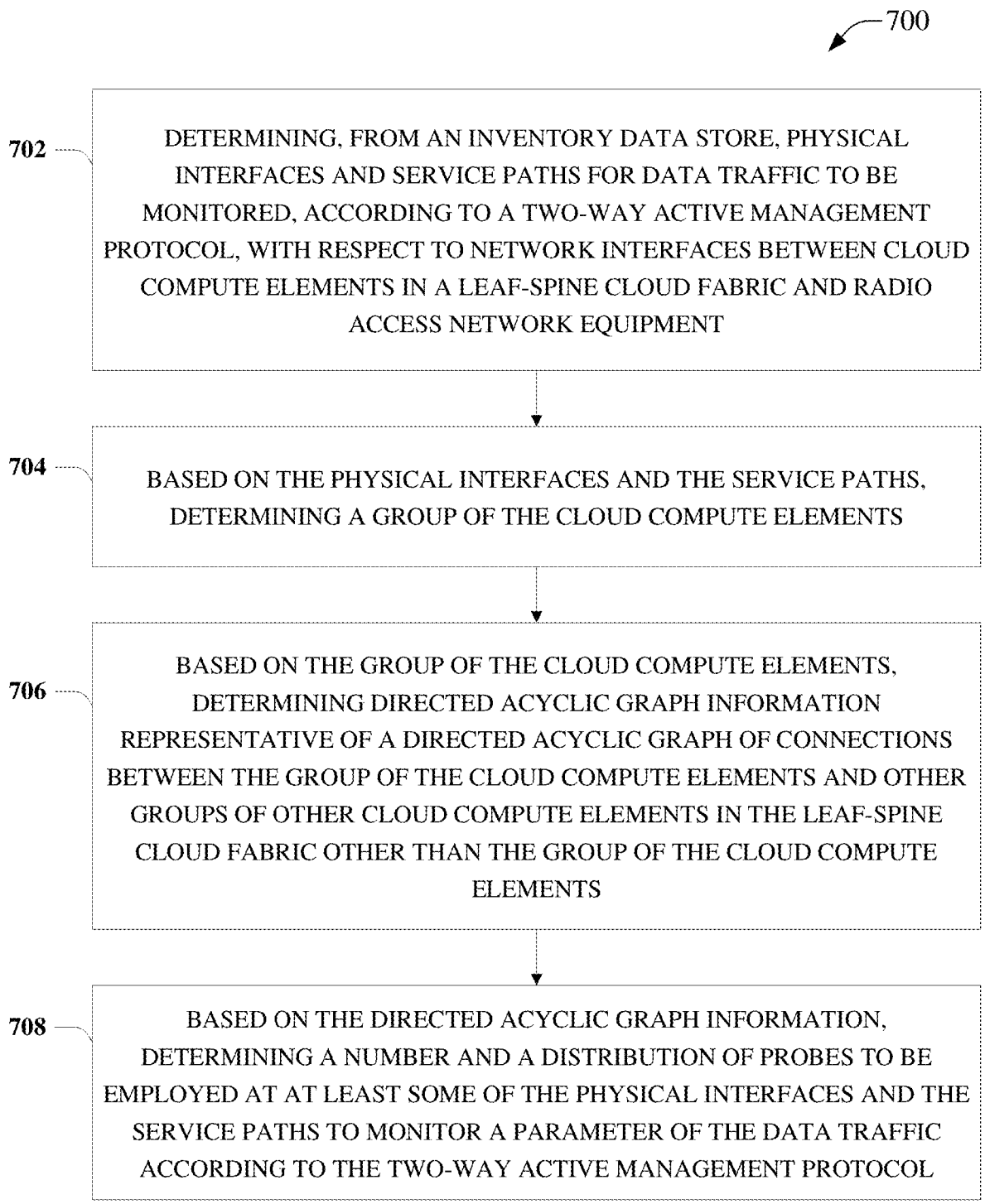
FIG. 7 is a block flow diagram for a process associated with network probe placement optimization in accordance with one or more embodiments described herein.

FIG. 7 illustrates a block flow diagram for a process 700 associated with network probe placement optimization in accordance with one or more embodiments described herein. At 702, the process 700 can comprise determining (e.g., using the topology component 110), from an inventory data store (e.g., data store 118), physical interfaces and service paths for data traffic to be monitored, according to a two-way active management protocol, with respect to network interfaces between cloud compute elements in a leaf-spine cloud fabric and radio access network equipment. At 704, the process 700 can comprise based on the physical interfaces and the service paths, determining (e.g., using the grouping component 112) a group of the cloud compute elements. At 706, the process 700 can comprise based on the group of the cloud compute elements, determining (e.g., using the graphing component 114) directed acyclic graph information representative of a directed acyclic graph of connections between the group of the cloud compute elements and other groups of other cloud compute elements in the leaf-spine cloud fabric other than the group of the cloud compute elements. At 708, the process 700 can comprise based on the directed acyclic graph information, determining (e.g., using the distribution component 116) a number and a distribution of probes to be employed at at least some of the physical interfaces and the service paths to monitor a parameter of the data traffic according to the two-way active management protocol.

Figure 8:
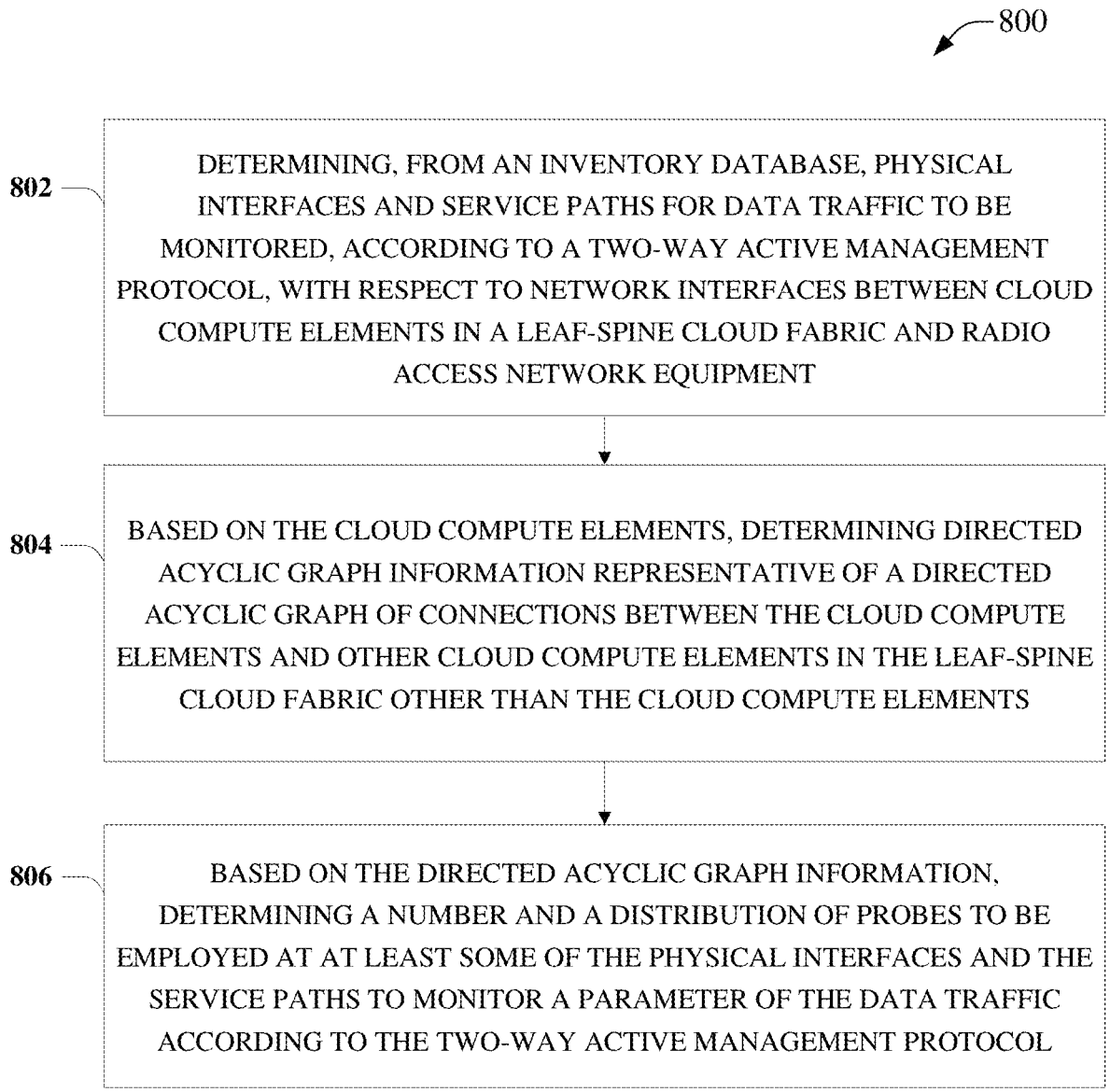
FIG. 8 is a block flow diagram for a process associated with network probe placement optimization in accordance with one or more embodiments described herein.

FIG. 8 illustrates a block flow diagram for a process 800 associated with network probe placement optimization in accordance with one or more embodiments described herein. At 802, the process 800 can comprise determining (e.g., using the topology component 110), from an inventory database, physical interfaces and service paths for data traffic to be monitored, according to a two-way active management protocol, with respect to network interfaces between cloud compute elements in a leaf-spine cloud fabric (e.g., network cloud local fabric 502) and radio access network equipment (e.g., metro 540). At 804, the process 800 can comprise based on the cloud compute elements, determining (e.g., using the graphing component 114) directed acyclic graph information representative of a directed acyclic graph of connections between the cloud compute elements and other cloud compute elements in the leaf-spine cloud fabric other than the cloud compute elements. At 806, the process 800 can comprise based on the directed acyclic graph information, determining (e.g., using the distribution component 116) a number and a distribution of probes to be employed at at least some of the physical interfaces and the service paths to monitor a parameter of the data traffic according to the two-way active management protocol.

Figure 9:
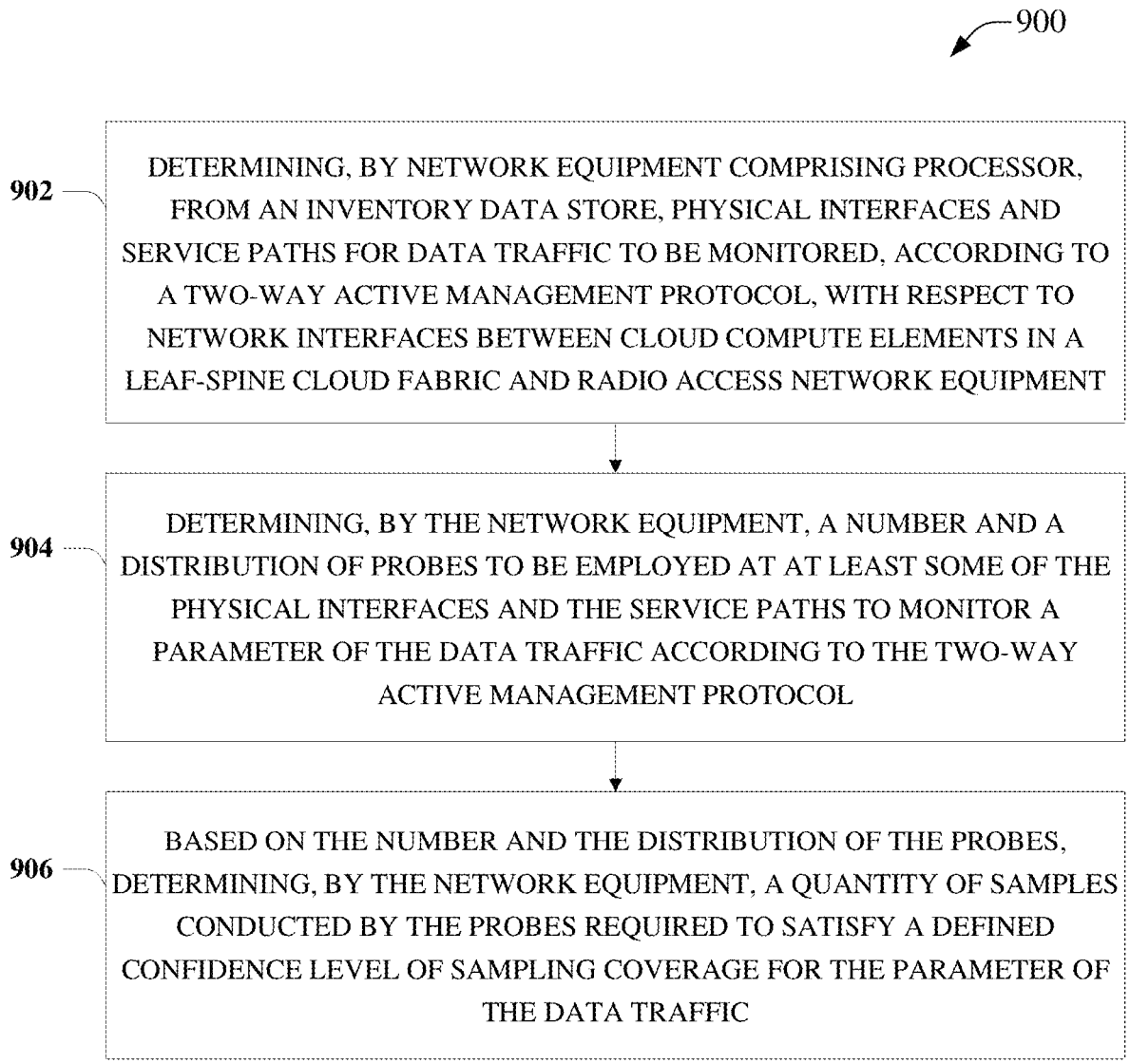
FIG. 9 is a block flow diagram for a process associated with network probe placement optimization in accordance with one or more embodiments described herein.

FIG. 9 illustrates a block flow diagram for a process 900 associated with network probe placement optimization in accordance with one or more embodiments described herein. At 902, the process 900 can comprise determining (e.g., using the topology component 110), by network equipment comprising processor, from an inventory data store (e.g., data store 118), physical interfaces and service paths for data traffic to be monitored, according to a two-way active management protocol, with respect to network interfaces between cloud compute elements in a leaf-spine cloud fabric and radio access network equipment. At 904, the process 900 can comprise determining (e.g., using the distribution component 116), by the network equipment, a number and a distribution of probes to be employed at at least some of the physical interfaces and the service paths to monitor a parameter of the data traffic according to the two-way active management protocol. At 906, the process 900 can comprise based on the number and the distribution of the probes, determining (e.g., using a sample component 306), by the network equipment, a quantity of samples conducted by the probes required to satisfy a defined confidence level of sampling coverage for the parameter of the data traffic. Such confidence levels herein can be predefined or can be determined (e.g., using a lookup table).

Figure 10:
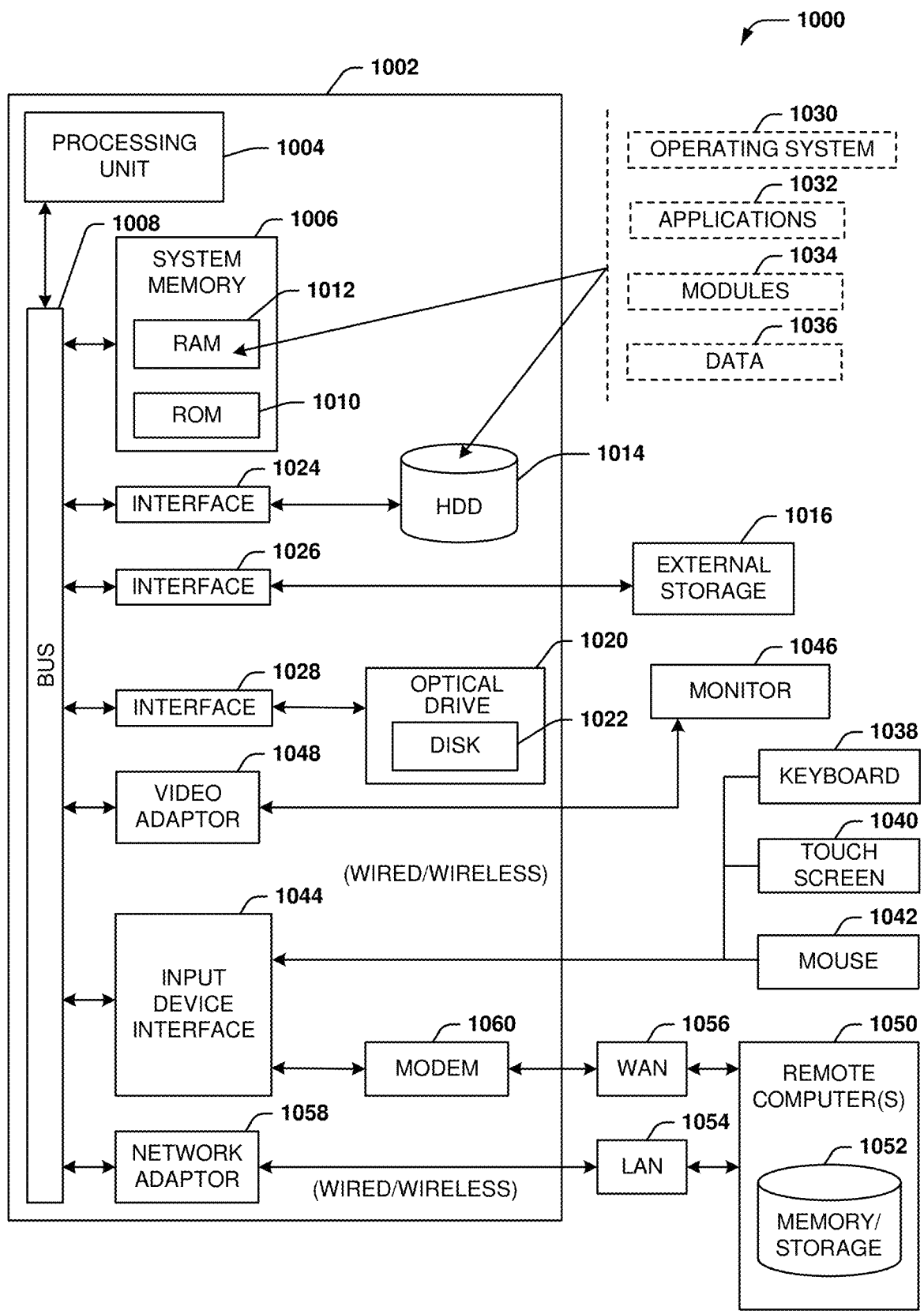
FIG. 10 is an example, non-limiting computing environment in which one or more embodiments described herein can be implemented.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a disk 1022 such as a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
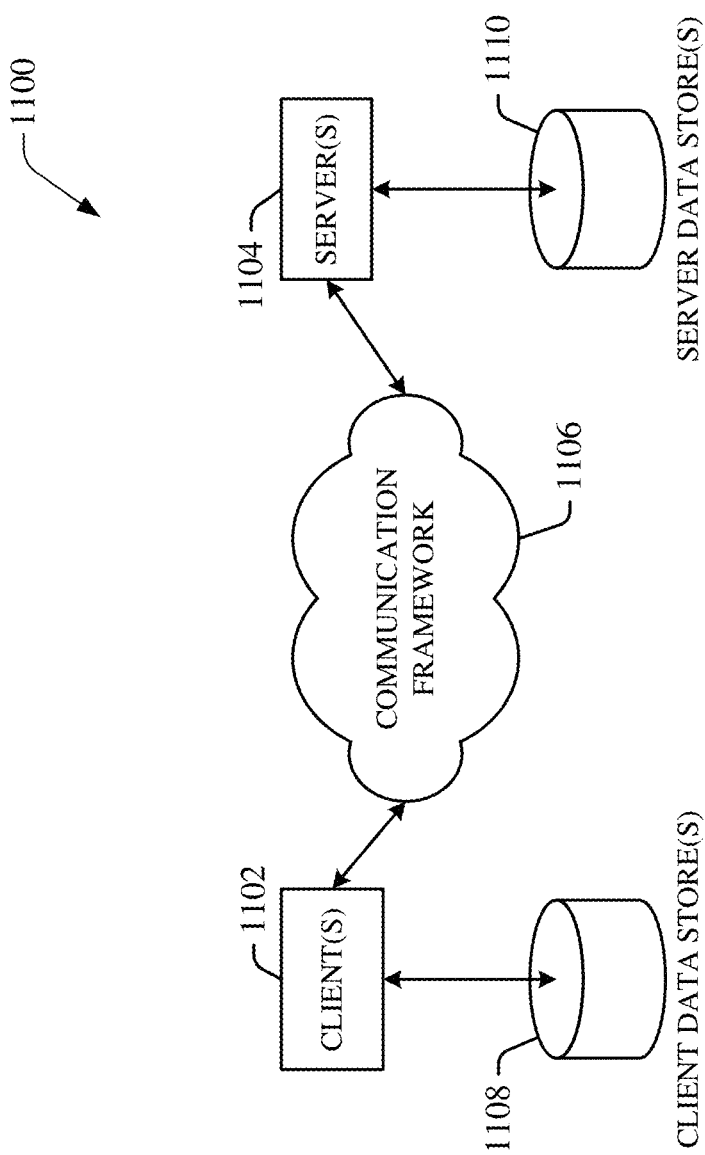
FIG. 11 is an example, non-limiting networking environment in which one or more embodiments described herein can be implemented.

Referring now to FIG. 11, there is illustrated a schematic block diagram of a computing environment 1100 in accordance with this specification. The system 1100 includes one or more client(s) 1102, (e.g., computers, smart phones, tablets, cameras, PDA's). The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform transformations of media items by employing aspects of this disclosure, for example. One possible communication between a client 1102 and a server 1104 can be in the form of a data packet adapted to be transmitted between two or more computer processes wherein data packets may include coded analyzed headspaces and/or input. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one exemplary implementation, a client 1102 can transfer an encoded file, (e.g., encoded media item), to server 1104. Server 1104 can store the file, decode the file, or transmit the file to another client 1102. It is noted that a client 1102 can also transfer uncompressed file to a server 1104 and server 1104 can compress the file and/or transform the file in accordance with this disclosure. Likewise, server 1104 can encode information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by network equipment comprising a processor and from an inventory data store, physical interfaces and service paths for data traffic to be monitored, according to a two-way active management protocol, with respect to network interfaces between cloud compute elements in a leaf-spine cloud fabric and radio access network equipment;

based on the physical interfaces and the service paths, determining, by the network equipment, a group of the cloud compute elements;

based on the group of the cloud compute elements, determining, by the network equipment, directed acyclic graph information representative of a directed acyclic graph of connections between the group of the cloud compute elements and other groups of other cloud compute elements in the leaf-spine cloud fabric other than the group of the cloud compute elements;

based on the directed acyclic graph information, determining, by the network equipment, a number and a distribution of probes to be employed at at least some of the physical interfaces and the service paths to monitor a parameter of the data traffic according to the two-way active management protocol;

generating, by the network equipment, a Monte Carlo sampling for attribute values for the probes, wherein the attribute values comprise source-ip, destination-ip, source-port, and destination-port; and based on the Monte Carlo sampling, determining, by the network equipment, a limit on quantity of samples of the service paths for use in monitoring the probes.

2. The method of claim 1, wherein the samples are obtained during a defined flow duration.

3. The method of claim 2, wherein the defined flow duration is approximately six minutes.

4. The method of claim 1, wherein the probes determine at least two of a latency, a loss, or a jitter of the data traffic.

5. The method of claim 1, further comprising:

determining, by the network equipment, a minimum group of paths of data traffic between groups of cloud compute elements in the leaf-spine cloud fabric for monitoring of the physical interfaces and the service paths for the data traffic according to the two-way active management protocol.

6. The method of claim 5, wherein the number and the distribution of the probes are determined to monitor the minimum group of paths of data traffic.

7. The method of claim 1, wherein determining the limit on the quantity of samples of the service paths comprises determining the limit on the quantity of samples of the service paths based on a specified degree of statistical certainty.

8. A system, comprising:

a processor; and a memory that stores executable instructions that, when executed by the processor, facilitate performance of operations, comprising:

determining, from an inventory data store, physical interfaces and service paths for data traffic to be monitored, according to a two-way active management protocol, with respect to network interfaces between cloud compute elements in a leaf-spine cloud fabric and radio access network equipment;

based on the physical interfaces and the service paths, determining a group of the cloud compute elements;

based on the group of the cloud compute elements, determining directed acyclic graph information representative of a directed acyclic graph of connections between the group of the cloud compute elements and other groups of other cloud compute elements in the leaf-spine cloud fabric other than the group of the cloud compute elements;

based on the directed acyclic graph information, determining a number and a distribution of probes to be employed at at least some of the physical interfaces and the service paths to monitor a parameter of the data traffic according to the two-way active management protocol;

generating a Monte Carlo sampling for attribute values for the probes, wherein the attribute values comprise source-ip, destination-ip, source-port, and destination-port; and based on the Monte Carlo sampling, determining a lower limit on a quantity of samples of the service paths for use in monitoring the probes.

9. The system of claim 8, wherein the operations further comprise:

determining a minimum number of paths of data traffic between groups of cloud compute elements in the leaf-spine cloud fabric for monitoring according to the two-way active management protocol, wherein the number and the distribution of the probes are determined to monitor the minimum number of paths of data traffic.

10. The system of claim 8, wherein the probes comprise pairs of sender probes and receiver probes defined according to the two-way active management protocol.

11. The system of claim 8, wherein determining the lower limit on the quantity of samples of the service paths comprises determining the lower limit on the quantity of samples of the service paths based on a specified degree of statistical certainty.

12. The system of claim 11, wherein increasing the specified degree of statistical certainty results in a larger lower limit on the quantity of samples, and wherein the larger lower limit comprises more samples than the lower limit on the quantity of samples.

13. The system of claim 11, wherein decreasing the specified degree of statistical certainty results in a smaller lower limit on the quantity of samples, and wherein the smaller lower limit comprises fewer samples than the lower limit on the quantity of samples.

14. The system of claim 8, wherein the number and the distribution of probes to be employed are further determined using a depth first search function.

15. The system of claim 8, wherein the probes comprise physical network probes.

16. The system of claim 8, wherein the probes comprise virtual network probes.

17. A non-transitory machine-readable medium, comprising executable instructions that, when executed by a processor, facilitate performance of operations, comprising:

determining, from an inventory database, physical interfaces and service paths for data traffic to be monitored, according to a two-way active management protocol, with respect to network interfaces between cloud compute elements in a leaf-spine cloud fabric and radio access network equipment;

based on the cloud compute elements, determining directed acyclic graph information representative of a directed acyclic graph of connections between the cloud compute elements and other cloud compute elements in the leaf-spine cloud fabric other than the cloud compute elements;

based on the directed acyclic graph information, determining a number and a distribution of probes to be employed at at least some of the physical interfaces and the service paths to monitor a parameter of the data traffic according to the two-way active management protocol;

determining a minimum number of paths of data traffic among the cloud compute elements in the leaf-spine cloud fabric and the other cloud compute elements in the leaf-spine cloud fabric usable to monitor according to the two-way active management protocol, wherein the number and the distribution of the probes are determined to be able to monitor the minimum number of paths of data traffic; and determining a quantity of samples to be obtained, by the probes, required to achieve a specified degree of statistical certainty for sampling coverage for the parameter of the data traffic, wherein the quantity of samples is determined using a harmonic series function associated with the service paths.

18. The non-transitory machine-readable medium of claim 17, wherein the samples are obtained according to a defined flow duration.

19. The non-transitory machine-readable medium of claim 18, wherein the defined flow duration is approximately six minutes.

20. The non-transitory machine-readable medium of claim 17, wherein the probes determine at least two of a latency, a loss, or a jitter of the data traffic.

* * * * *